UNITED STATES PATENT OFFICE.

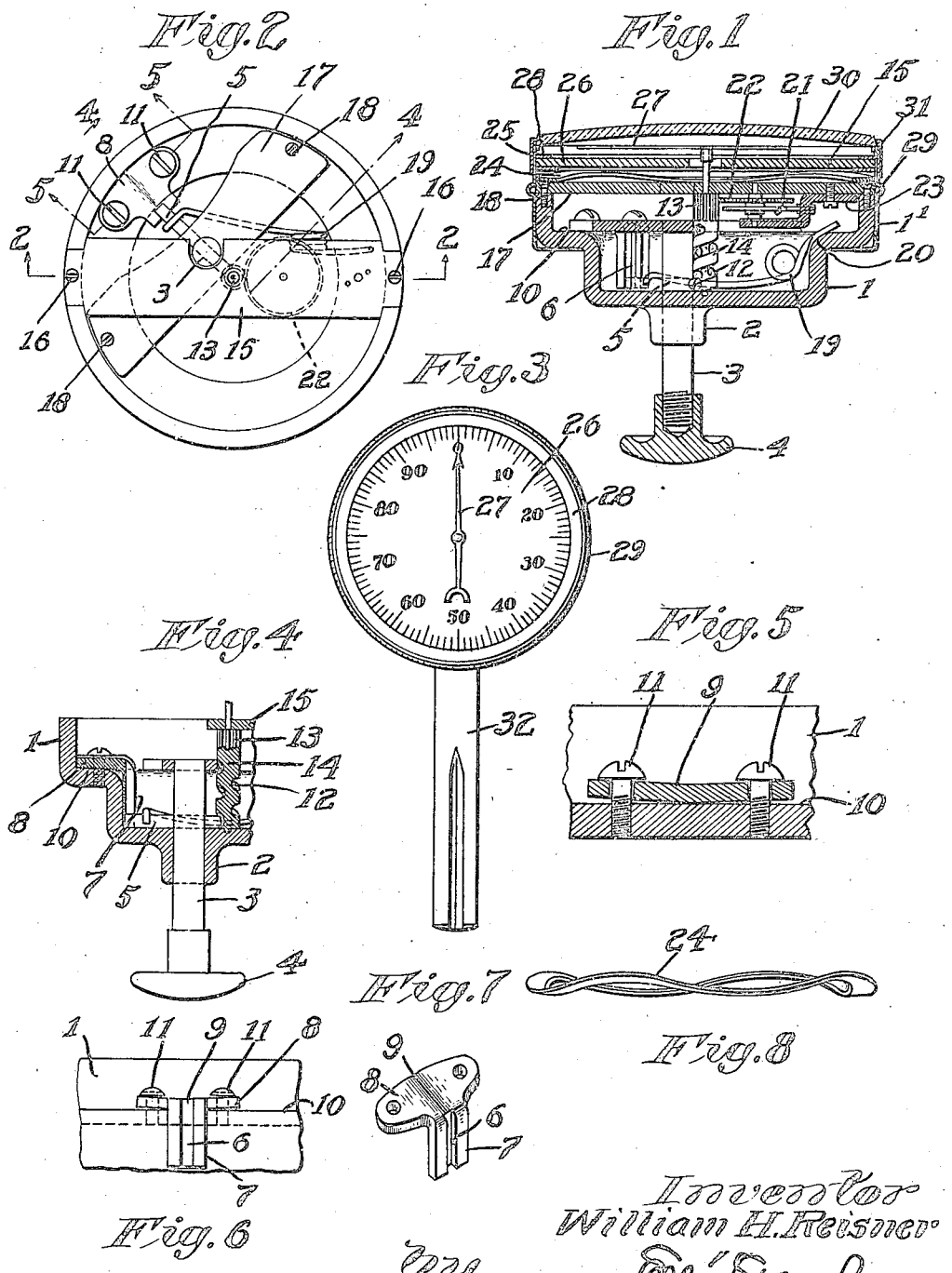

WILLIAM H. REISNER, OF HAGERSTOWN, MARYLAND, ASSIGNOR TO THE L. S. STARRETT COMPANY, OF ATHOL, MASSACHUSETTS, A CORPORATION OF MASSACHUSETTS.

INDICATING SURFACE GAUGE.

1,419,306.  Specification of Letters Patent.  Patented June 13, 1922.

Application filed April 7, 1921. Serial No. 459,443.

*To all whom it may concern:*

Be it known that I, WILLIAM H. REISNER, a citizen of the United States, residing at Hagerstown, county of Washington, and State of Maryland, have invented certain new and useful Improvements in Indicating Surface Gauges, of which the following is a specification.

This invention relates to indicating surface gauges, and involves certain improvements and refinements over the gauges described in the Reisner Patent #773,983, and the Reisner and Middlekauf Patent #968,884, to which reference is made as illustrating the particular type of gauge involved herein.

The object of my present invention is to provide a conveniently adjustable guide for the cross pin which actuates the pointer-carrying pinion of the gauge whereby said pin may be accurately alined with and maintained in engagement in the helical groove of said pinion throughout its entire actuating travel.

This object, and certain other features of advantage which will appear more particularly hereinafter, are secured in the device of the present invention.

The construction and operation of my gauge, together with a selected embodiment which well illustrates the principles involved, are disclosed in the accompanying specification and drawings, and the characteristic features of novelty particularly pointed out in the appended claims.

Throughout the specification and drawings like reference characters are correspondingly employed, and in the drawings:—

Fig. 1 is a vertical central section on approximately the line 2—2 of Fig. 2 through a gauge in accordance with my invention.

Fig. 2 is a top plan view of the gauge with the crystal and dial removed to illustrate the interior construction.

Fig. 3 is a face view of my gauge.

Figs. 4 and 5 are sections on the lines 4—4 and 5—5, respectively, of Fig. 2.

Fig. 6 is an elevation of the adjustable guide for the cross pin.

Fig. 7 is a perspective view of such guide, removed, and

Fig. 8 is a view of the undulating spring washer upon which the dial rests.

I have indicated at 1 the cup-shaped casing of an indicating surface gauge in accordance with my invention. Extending downwardly from the bottom of said casing eccentrically thereof is a boss 2 in which is mounted a reciprocable push pin 3 which is provided at its outer end with a work-contacting button 4.

Set diametrically through the push pin 3 within the casing is a cross pin 5, one end of which is disposed for guided travel in a vertical slot 6 formed in the depending guide portion 7 of an adjustable guide plate 8.

The horizontal attaching portion of said guide plate rests upon a radially disposed shelf or shoulder 10 formed interiorly of the casing, and is secured thereto by a pair of screws 11 disposed one at each end of said horizontal portion. Between its ends, the attaching portion of the guide plate is slightly dished as indicated at 9, Figs. 5, 6 and 7, so that the ends of said attaching portion normally tend to stand slightly above the plane of the supporting shoulder 10.

This produces an angular pivot at the under face of the horizontal attaching portion. By loosening one screw 11 and tightening the other, the guide plate may be swung to either side, the pivot portion thereof fulcruming on the shoulder 10 in such adjustment of the plate.

The purpose of this adjustment is to permit the cross pin 5 to be so guided in its travel as to always accurately align with and engage in the helical groove 12 of the grooved barrel 14 of pointer-carrying pinion 13 which is journaled at its lower end in a step bearing on the casing bottom.

Said pinion is disposed axially of the casing, and at its upper end is journaled in a bridge 15 which is secured by screws 16 to the upper edge of the casing.

The push pin 3 is guided at its upper end in a bridge 17 disposed below and angularly to the bridge 15 and detachably fastened to the casing by screws 18. Said pin 3 is normally maintained in depressed position by a coil and straight spring 19 which is fixed at one end to the casing as indicated at 20 and at its opposite end overlies the cross pin 5 carried by the push pin. The spring 19 is assisted in its action by a hair spring 21 which acts upon a small gear wheel 22 in mesh with the pinion 13 on the vertically disposed barrel 14. The gear 22 is journaled between the upper bridge 15 and a bracket 23 fastened to the under face of said bridge.

Overlying the bridge 17 is a spring washer 24 having the undulating form detailed in Fig. 8 and supporting a flat spring washer 25 upon which rests the dial 26. Said dial is provided with a central opening through which the upper journal of the vertically disposed barrel pinion 13 extends. Fast to said journal is a pointer 27 which sweeps the dial. A third washer 28 rests upon the upper face of the dial at its circumference and is suitably locked to the upper rotatable section 1' of the casing.

Upon rotation of the section 1' relative to the section 1, the zero mark of the dial is brought to the point of rest of the hand or pointer 27, the section 1' being externally milled or knurled as indicated at 29 to afford purchase for the fingers in turning it. The pointer and dial are protected by a crystal 30 which is held within the upper edge of the casing by a bezel 31.

Extending laterally from the lower part of the casing is a rod 32 with which connection may be made to bring the casing into cooperative relation with the work.

Various modifications in the form and construction of parts may be resorted to within the limits of the appended claims.

What I therefore desire to secure by Letters Patent is:

1. In a gauge, a guide-supporting surface, an actuatable member, an actuating member engageable with said actuatable member, a guide for said actuating member fulcrumed upon said guide supporting surface and means for rocking said guide upon its fulcrum to adjust said guide relative to the actuatable member.

2. In a gauge, a casing having a guide supporting surface, an actuatable member mounted in said casing, an actuating member engageable with said actuatable member, and a guide for said actuating member rockingly mounted on said supporting surface and adjustable relative to said actuating member to maintain said member in accurately alined engagement with said actuatable member.

3. In a gauge, a casing having a guide supporting surface, a helically grooved member mounted in said casing, an actuating member engageable with said actuatable member, and a guide for said actuating member rockingly mounted on said supporting surface and having a guiding slot adjustable relative to said actuating member to maintain said member in accurately alined engagement with said groove of the actuatable member.

4. In a gauge, a casing having a guide supporting surface, a helically grooved pointer-carrying member mounted in said casing, an actuator having a portion disposed for engagement in said groove, and an adjustable guide for said actuator comprising a member having a slotted guide portion and having an angularly disposed attaching portion rockingly mounted on said supporting surface of the casing.

5. In a gauge, a casing having a shoulder, a rotary pointer barrel having a helical groove mounted in said casing, a push pin slidable in said casing, a cross pin carried by said push pin and engaged at one end in said helical groove, and an adjustable guide having a vertical slot receiving the opposite end of said pin and having an angularly disposed attaching portion mounted to rock on said shoulder of the casing.

6. In a gauge, a shouldered casing, a push pin, a guide having an attaching portion fulcrumed on said shoulder and having a guide way, an operating member carried by said push pin and guided in said guideway, and means to rock said attaching portion on its fulcrum to adjust said guideway.

7. In a gauge, a radially shelving casing, a vertically sliding push pin, a guide having a horizontal attaching portion centrally fulcrumed on said shelf and having a vertically disposed guideway, an operating member carried by said push pin and guided in said guideway, and means to rock said attaching portion on its fulcrum to adjust said guideway.

8. In a gauge, a casing having a supporting surface, an actuatable member and an actuating member in said casing and engageable with each other, and an adjustable guide comprising a member having a guideway for said actuating member and having an angularly disposed attaching portion bent between its ends and fulcruming upon said supporting surface of the casing and adjacent its ends fastened to said supporting surface.

9. In a gauge, a casing having a supporting surface, an actuatable member and an actuating member in said casing and engageable with each other, and an adjustable guide comprising a member having an elongated slotted guideway for said actuating member and having an angularly disposed attaching portion fulcruming on said supporting surface of the casing, and means for adjustably positioning said attaching portion of the guide on said fulcrum to vary the position of the guideway relative to said actuating member.

10. In a gauge, a casing having a supporting surface, an actuatable member and an actuating member in said casing and engageable with each other, and an adjustable guide comprising a plate of L form having a guideway for said actuating member and having an attaching portion fulcruming on said supporting surface of the casing, and means for adjustably positioning said attaching portion on said fulcrum to vary the position of said guideway relative to said actuating member.

In testimony whereof I affix my signature in presence of two witnesses.

WILLIAM H. REISNER.

Witnesses:
SAM B. LOOSE,
ALEXANDER H. CAMPBELL.